United States Patent [19]
Grob et al.

[11] Patent Number: 5,960,362
[45] Date of Patent: Sep. 28, 1999

[54] METHOD AND APPARATUS FOR ACCESS REGULATION AND SYSTEM PROTECTION OF A DISPATCH SYSTEM

[75] Inventors: Matthew S. Grob, La Jolla; Yu-Dong Yao, San Diego; Eric J. Lekven, Carlsbad, all of Calif.

[73] Assignee: Qualcomm Incorporated, San Diego, Calif.

[21] Appl. No.: 08/671,132

[22] Filed: Jun. 24, 1996

[51] Int. Cl.⁶ .................................................. H04B 1/00
[52] U.S. Cl. .................... 455/527; 340/825.5; 379/208; 455/528
[58] Field of Search ...................... 455/527, 528, 455/31.1, 512, 510, 521; 379/208; 340/825.5, 825.51; 370/342; 375/200

[56] References Cited

U.S. PATENT DOCUMENTS

| | | | |
|---|---|---|---|
| 2,680,154 | 6/1954 | Dorff .................................. | 455/528 X |
| 3,609,245 | 9/1971 | Richter et al. ...................... | 379/208 X |
| 4,612,415 | 9/1986 | Zdunek et al. ...................... | 455/512 X |
| 4,882,751 | 11/1989 | Kotzin et al. ........................ | 380/9 |
| 4,977,589 | 12/1990 | Johnson et al. ...................... | 455/403 |
| 5,249,304 | 9/1993 | Mulford .............................. | 455/512 |
| 5,465,391 | 11/1995 | Toyryla .............................. | 455/422 |
| 5,555,447 | 9/1996 | Kotzin et al. ....................... | 455/509 X |
| 5,625,879 | 4/1997 | Tuulos ................................. | 455/509 |
| 5,638,055 | 6/1997 | McDonald et al. .................. | 455/512 |
| 5,666,364 | 9/1997 | Pierce et al. ........................ | 379/208 X |

*Primary Examiner*—Thomas Mullen
*Attorney, Agent, or Firm*—Russell B. Miller; Thomas M. Thibault

[57] ABSTRACT

A method and apparatus to provide access to a dispatch system is disclosed. A communications manager (40) grants an exclusive system talker privilege to one remote unit (10) in the system at a time. After a remote unit (10) requests and is designated as the exclusive system talker, no other remote unit (20, 22) may transmit for a first pre-determined amount of time. After the first pre-determined time has elapsed, any other remote unit (20, 22) may request the exclusive system talker privilege and become the exclusive system talker. The exclusive system talker privilege is revoked by the communications manager (40) to any remote unit who retains the exclusive system talker privilege for more than a second pre-determined amount of time. The exclusive system talker privilege is also revoked upon the release of a push-to-talk button on a remote unit (10). Furthermore, a base station (44) in communication with a remote unit (10) designated as the exclusive system talker will generate a surrogate relinquishment request to the communications manager (40) if the exclusive system talker travels outside the coverage area of the system, loses power, or is destroyed.

24 Claims, 6 Drawing Sheets

METHOD AND APPARATUS FOR ACCESS REGULATION AND SYSTEM PROTECTION OF A DISPATCH SYSTEM

This invention was made with Government support under MDA904-94-C-C116 awarded by the National Security Agency.

BACKGROUND OF THE INVENTION

I. Field of the Invention

This invention relates generally to a dispatch system and, more particularly, to access regulation in a dispatch system.

II. Description of the Related Art

In a wireless telephone communication system, many users communicate over a wireless channel to connect to other wireless and wireline telephone systems. Communication over the wireless channel can be one of a variety of multiple access techniques. These multiple access techniques include time division multiple access (TDMA), frequency division multiple access (FDMA), and code division multiple access (CDMA). The CDMA technique has many advantages. An exemplary CDMA system is described in U.S. Pat. No. 4,901,307 issued Feb. 13, 1990 to K. Gilhousen et al., entitled "SPREAD SPECTRUM MULTIPLE ACCESS COMMUNICATION SYSTEM USING SATELLITE OR TERRESTRIAL REPEATERS," assigned to the assignee of the present invention and incorporated herein by reference.

In the just mentioned patent, a multiple access technique is disclosed where a large number of mobile telephone system users, each having a transceiver, communicate through satellite repeaters, airborne repeaters, or terrestrial base stations using CDMA spread spectrum communication signals. In using CDMA communications, the frequency spectrum can be reused multiple times permitting an increase in system user capacity.

In the CDMA cellular system, each base station transceiver subsystem provides coverage to a limited geographic area and links the remote units in its coverage area through a system switch to the public switched telephone network (PSTN). When a remote unit moves to the coverage area of a new base station transceiver subsystem, the routing of the remote unit's call is transferred to the new base station transceiver subsystem. The base station-to-remote unit signal transmission path is referred to as the forward link and the remote unit-to-base station signal transmission path is referred to as the reverse link.

In an exemplary CDMA system, each base station transceiver subsystem transmits a pilot signal having a common pseudorandom noise (PN) spreading code that is offset in code phase from the pilot signal of other base station transceiver subsystems. During system operation, the remote unit is provided with a list of code phase offsets corresponding to neighboring base station transceiver subsystems surrounding the base station transceiver subsystem through which communication is established. The remote unit is equipped with a searching element with which it tracks the signal strength of the pilot signal from a group of base station transceiver subsystems including the neighboring base station transceiver subsystems.

A method and system for providing communication with a remote unit through more than one base station transceiver subsystem during the handoff process are disclosed in U.S. Pat. No. 5,267,261, entitled "MOBILE ASSISTED SOFT HANDOFF IN A CDMA CELLULAR COMMUNICATION SYSTEM," issued Nov. 30, 1993, assigned to the assignee of the present invention. Using this system, communication between the remote unit and the end user is uninterrupted by the eventual handoff from an original base station transceiver subsystem to a subsequent base station transceiver subsystem. This type of handoff may be considered a "soft" handoff in that communication with the subsequent base station transceiver subsystem is established before communication with the original base station transceiver subsystem is terminated. When the remote unit is in communication with two base station transceiver subsystems, the remote unit combines the signals received from each base station transceiver subsystem in the same manner that multipath signals from a common base station transceiver subsystem are combined.

In a typical macrocellular system, a system controller may be employed to create a single signal for the end user from the signals received by each base station transceiver subsystem. Within each base station transceiver subsystem, signals received from a common remote unit may be combined before they are decoded and thus take full advantage of the multiple signals received. The decoded result from each base station transceiver subsystem is provided to the system controller. Once a signal has been decoded it cannot be 'combined' with other signals. Thus the system controller must select between the plurality of decoded signals produced by each base station transceiver subsystem with which communication is established by a single remote unit. The most advantageous decoded signal is selected from the set of signals from the base station transceiver subsystems and the unchosen signals are simply discarded.

Because the remote unit is communicating with the end user through at least one base station transceiver subsystem at all times throughout the soft handoff process, no interruption in communication occurs between the remote unit and the end user. A soft handoff provides significant benefits in its inherent "make before break" technique over the conventional "break before make" technique employed in other cellular communication systems.

In a wireless telephone system, maximizing the capacity of the system in terms of the number of simultaneous telephone calls that can be handled is extremely important. System capacity in a spread spectrum system can be maximized if the transmission power of each remote unit is controlled such that each transmitted signal arrives at the base station transceiver subsystem receiver at the same level. In an actual system, each remote unit may transmit the minimum signal level that produces a signal-to-noise ratio that allows acceptable data recovery. If a signal transmitted by a remote unit arrives at the base station transceiver subsystem receiver at a power level that is too low, the bit-error-rate may be too high to permit high quality communications due to interference from the other remote units. On the other hand, if the remote unit transmitted signal is at a power level that is too high when received at the base station transceiver subsystem, communication with this particular remote unit is acceptable but this high power signal acts as interference to other remote units. This interference may adversely affect communications with other remote units.

Therefore to maximize capacity in an exemplary CDMA spread spectrum system, the transmit power of each remote unit within the coverage area of a base station transceiver subsystem is controlled by the base station transceiver subsystem to produce the same nominal received signal power at the base station transceiver subsystem. In the ideal case, the total signal power received at the base station transceiver subsystem is equal to the nominal power received from each remote unit multiplied by the number of remote units transmitting within the coverage area of the base station transceiver subsystem plus the power received at the base station transceiver subsystem from remote units in the coverage area of neighboring base station transceiver subsystems.

It is also desirable to control the relative power used in each data signal transmitted by the base station transceiver subsystem in response to control information transmitted by each remote unit. The primary reason for providing such control is to accommodate the fact that in certain locations the forward channel link may be unusually disadvantaged. Unless the power being transmitted to the disadvantaged remote unit is increased, the signal quality may become unacceptable. An example of such a location is a point where the path loss to one or two neighboring base station transceiver subsystems is nearly the same as the path loss to the base station transceiver subsystem communicating with the remote unit. In such a location, the total interference would be increased by three times over the interference seen by a remote unit at a point relatively close to its base station transceiver subsystem. In addition, the interference coming from the neighboring base station transceiver subsystems does not fade in unison with the signal from the active base station transceiver subsystem as would be the case for interference coming from the active base station transceiver subsystem. A remote unit in such a situation may require 3 to 4 dB additional signal power from the active base station transceiver subsystem to achieve adequate performance.

At other times, the remote unit may be located where the signal-to-interference ratio is unusually good. In such a case, the base station transceiver subsystem could transmit the desired signal using a lower than normal transmitter power, reducing interference to other signals being transmitted by the system.

To achieve the above objectives, a signal-to-interference measurement capability can be provided within the remote unit receiver. This measurement is performed by comparing the power of the desired signal to the total interference and noise power. If the measured ratio is less than a predetermined value, the remote transmits a request to the base station transceiver subsystem for additional power on the forward link signal. If the ratio exceeds the predetermined value, the remote unit transmits a request for power reduction. One method by which the remote unit receiver can monitor signal-to-interference ratios is by monitoring the frame error rate (FER) of the resulting signal. Another way is by measuring the number of erasures received.

The base station transceiver subsystem receives the power adjustment requests from each remote unit and responds by adjusting the power allocated to the corresponding forward link signal by a predetermined amount. The adjustment is typically small, such as on the order of 0.5 to 1.0 dB, or around 12%. The rate of change of power may be somewhat slower than that used for the reverse link, perhaps once per second. In the preferred embodiment, the dynamic range of the adjustment is typically limited such as from 4 dB less than nominal to about 6 dB greater than nominal transmit power.

The base station transceiver subsystem should also consider the power demands being made by other remote units in deciding whether to comply with the requests of any particular remote unit. For example, if the base station transceiver subsystem is loaded to capacity, requests for additional power may be granted, but only by 6% or less, instead of the normal 12%. In this regime, a request for a reduction in power would still be granted at the normal 12% change.

When the original cellular telephone licenses were issued by the government, one of the restrictions on use of the spectrum was that the carriers could not provide dispatching system services. However, because of the great advantages of the CDMA system and the inherent expense and problems of deployment and maintenance of private dispatch systems, the government is re-examining this issue. The government itself would benefit greatly from such services.

Whereas typical wireless and wireline telephone service provides point-to-point service, dispatching services provide one-to-many service. Common usage of dispatch services are local police radio systems, taxicab dispatch systems, Federal Bureau of Intelligence and secret service operations, and general military communication systems.

The basic model of a dispatch system consists of a broadcast net of users. Each broadcast net user monitors a common broadcast forward link signal. If a net user wishes to talk, he presses a push-to-talk (PTT) button. Typically the talking user's voice is routed from the reverse link over the broadcast forward link. Ideally the dispatch system allows landline and wireless access to the system.

When a remote unit which is part of a dispatch system presses the push-to-talk button, he would like to immediately begin speaking. However in conventional wireless systems, a perceptible amount of time is necessary to establish a link before the user may begin speaking. The present invention is an efficient solution to system access. The present invention also provides a means to regulate and protect system access in dispatch system.

SUMMARY OF THE INVENTION

When a remote unit initially presses the push-to-talk button, a set of resources is allocated. When the remote unit releases the push-to-talk button, the resources remain dedicated to the remote unit for some period of time. During the time when the user is not depressing the push-to-talk button, the remote unit and base station transceiver subsystems send a low rate series of idle frames to each other to preserve the link power control. In this way, when the remote unit user subsequently depresses the push-to-talk button, the link is completely established and immediately responsive. This type of operation accommodates the natural use of a dispatch system.

The time during which a remote unit is pressing the push-to-talk button is divided into two different periods. During the first period of time, the remote unit is given full priority use of the system once it has been granted as the system talker. When the first period of time expires, a second period of time commences. During the second period of time, if any other remote unit presses the push-to-talk button, the first remote unit is preempted and it is denied system talker privileges. The interrupting remote unit is granted as the system talker.

Typically when the push-to-talk button is released, the remote unit sends a PTT_off indication to the base station. The base station passes the PTT_off indication to the communications manager so that the communications manager may grant a new remote unit as the system talker. If however a remote unit has been granted as the system talker and during that time drives out of the coverage area of the system, the remote unit is unable to transmit a PTT_off indication to the base station. The base station is aware that the remote unit has exited the coverage area but the communications manager is not. In response to the egress of the remote unit, the base station generates a surrogate PTT_off indication to send the communications manager. The communications manager responds by denying the remote unit system talker access and therefore freeing other remote units to become the system talker.

BRIEF DESCRIPTION OF THE DRAWINGS

The features, objects, and advantages of the present invention will become more apparent from the detailed description set forth below when taken in conjunction with the drawings wherein.

DESCRIPTION OF THE PREFERRED EMBODIMENT

Figure 1:
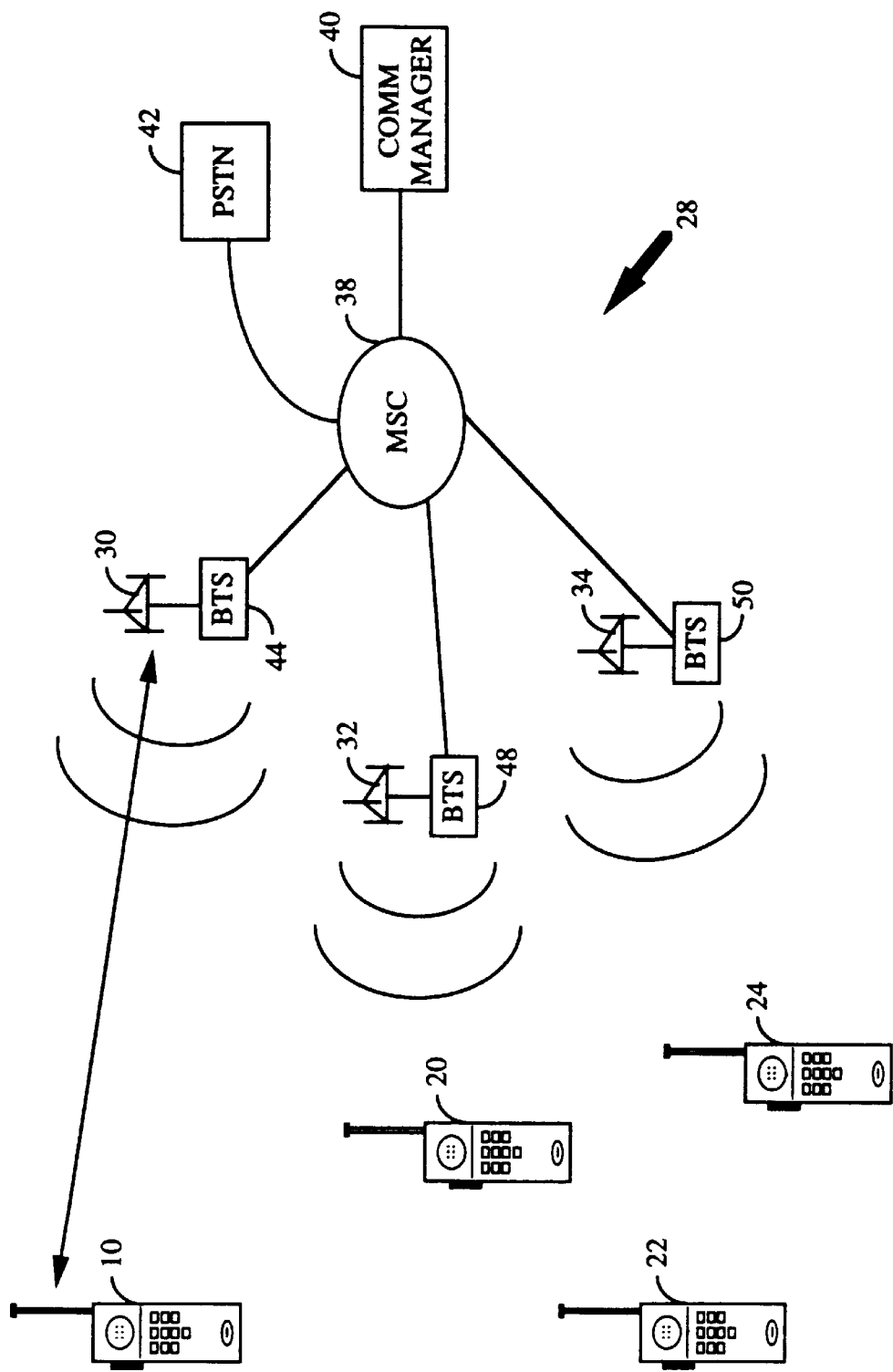
FIG. 1 shows a typical dispatch system.

FIG. 1 shows a typical dispatch system. In the preferred embodiment, remote units 10, 20, 22, and 24 may function both as dispatch units and as point-to-point telephones. In FIG. 1, remote unit 10 is currently an active talker and remote units 20, 22, and 24 are currently passive listeners. Base station antennas 30, 32, and 34 may provide the broadcast forward link channel to remote units 20, 22, and 24. Base station antenna 30 transmits and receives a dedicated forward and reverse traffic channel to and from remote unit 10. The dedicated traffic channel is similar to the forward link broadcast channel except that, for example, remote unit 10 may receive other remote unit specific signaling information such as power control commands. In the preferred embodiment, power control on the dedicated traffic channel link with remote unit 10 is accomplished as disclosed in U.S. Pat. No. 5,056,109 entitled "METHOD AND APPARATUS FOR CONTROLLING TRANSMISSION POWER IN A CDMA CELLULAR MOBILE TELEPHONE SYSTEM," issued Oct. 8, 1991, assigned to the assignee of the present invention. Mobile switching center (MSC) 38 coordinates the signaling to and from all the base station transceiver subsystems such as base station transceiver subsystems 44, 48, and 50. The system comprising base station antennas 30,32, and 34, and base station transceiver subsystems 44, 48, and 50 and MSC 38 is referred to as base station 28. Communications manager 40 controls the net such as the granting system talker privilege to a remote unit whose user has pressed the 'push-to-talk' (PTT) button. In the preferred embodiment, the air interface signaling and modulation is in accordance with the Code Division Multiple Access (CDMA) system described in "Mobile Station-Base Station Compatibility Standard for Dual-Mode Wideband Spread Spectrum Cellular Systems" TIA/EIA/IS-95, generally referred to simply as IS-95. In IS-95, the remote unit is referred to as a mobile station.

It is well known in the art that base station transceiver subsystems may be sectorized such as into three sectors. Where the term base station or base station transceiver subsystems is used herein, it is implied that the term may refer to an entire base station transceiver subsystem or to a single sector of a base station transceiver subsystem.

In FIG. 1 active remote unit 10 has an established bidirectional link with base station transceiver subsystem 44. In order to become active, remote unit 10 sends an access channel message requesting a traffic channel to base station transceiver subsystem 44. The access message is sent on the access channel. The access channel is a reverse link channel used by remote units for communicating to the base station. The access channel is a shared slotted random access channel. Only one remote unit for base station transceiver subsystem sector can successfully use the access channel at one time. The access channel is used for short signaling message exchanges such as call originations, responses to pages, and registration. An access attempt is sent by the remote unit in a series of access probes. Each access probe carries the same information but is transmitted at a higher power level than the previous one. The access probes continue until a base station acknowledgment is received at the remote unit.

When remote unit 10 has established a communication link, it receives any signaling present on the forward broadcast channel on a dedicated forward link traffic channel. In this way, remote unit 10 does not monitor the forward link broadcast channel yet it receives all of the dispatch system information on its own dedicated forward link traffic channel. Remote unit 10 communicates back to base station transceiver subsystem 44 on a dedicated reverse channel. In the preferred embodiment, power control on the forward and reverse links is performed as described above in accordance with IS-95. Because remote unit 10 has its own dedicated forward link signal path, remote unit specific messaging may be included in the signaling. For example, if remote unit 10 is capable of operating both as a dispatch system remote unit and as a point-to-point telephone unit, remote unit 10 may be informed on the forward link traffic channel that an incoming point-to-point call is being directed toward remote unit 10.

On the other hand, in FIG. 1, passive remote units 20, 22, and 24 do not have an established reverse link signal to any of the base station transceiver subsystems. Note that if remote units 20, 22 and 24 are completely passive, the individual base station transceiver subsystems may be unaware of whether the remote units are in their corresponding coverage areas. Even if a remote unit registers with the base station transceiver subsystem when it enters the coverage area of a base station transceiver subsystem, the base station transceiver subsystem has no way of knowing when the remote unit has left the base station transceiver subsystem coverage area.

Even if remote units 20, 22 and 24 are passive, they still may use the access channel to communicate with the base station. In the preferred embodiment, passive remote units 20, 22 and 24 use the access channel to signal the base station transceiver subsystem if they are in need of more power from the forward link broadcast channel. In response to the power request access message, the base station transceiver subsystem may increase the transmit power level of the forward link broadcast channel.

Figure 4:
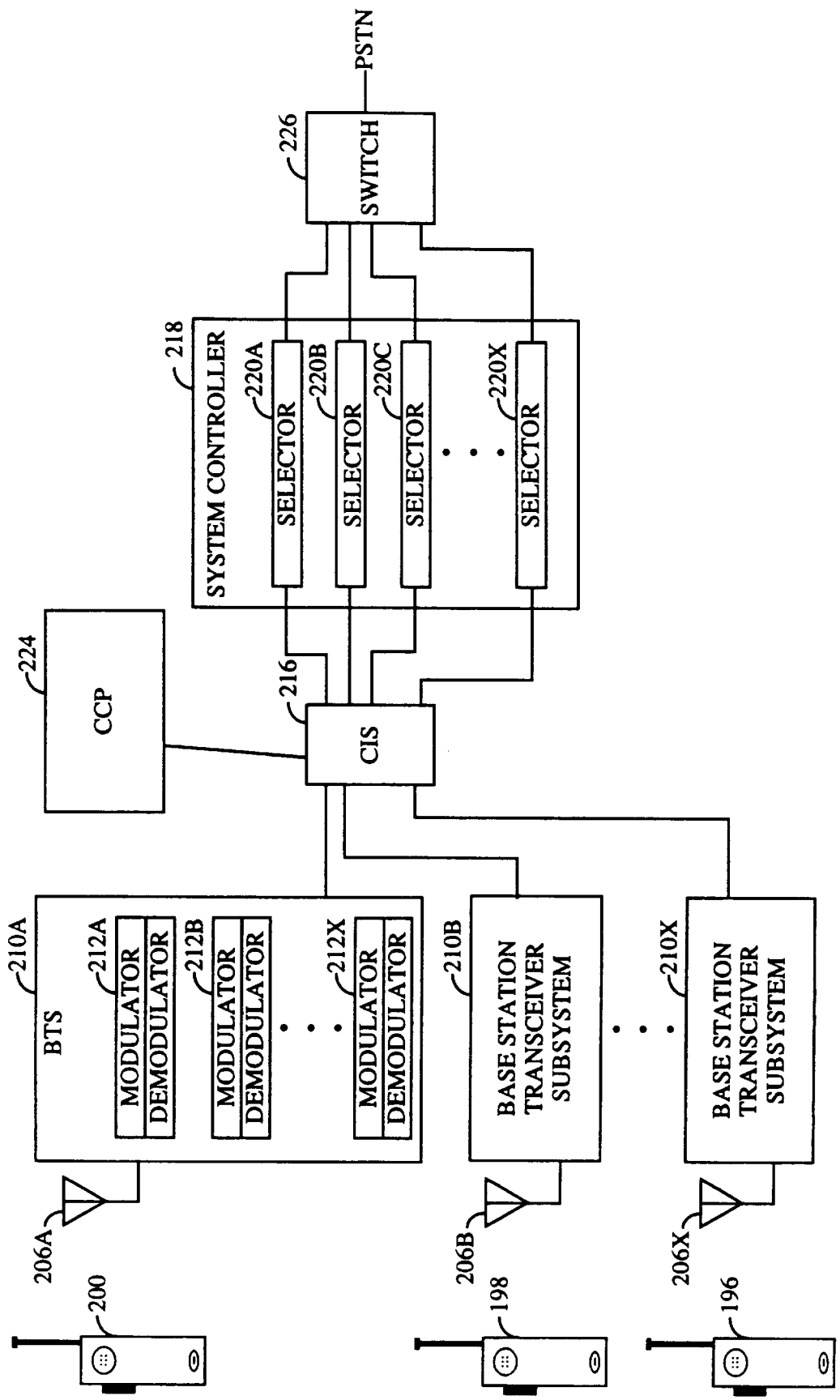
FIG. 4 shows a more detailed representation of a typical dispatch system.

When a remote unit initiates a connection, a series of transactions must take place to allocate resources. For example FIG. 4 shows a more detailed representation of a typical dispatch system. In FIG. 4, CDMA interconnect subsystem 216, call control processor 224 and system controller 218 may be included within MSC 38 of FIG. 1. To initiate a connection, remote unit 200 sends an origination message on an access channel comprising a PTT_on indicating that the push-to-talk button has been depressed. Base station 210A receives the message and sends a message to system controller 218 through CDMA interconnect subsystem 216. System controller 218 sends a message back to base station 210A which in response sends a message over the paging channel to remote unit 200 acknowledging the receipt of the access message. System controller 218 must notify call control processor (CCP) 224 which oversees the call. Call control processor 224 manages any variety of services which may be requested (for example, point-to-point, push-to-talk services, data services, or secure voice services,). If call control processor 224 issues a grant to allocate resources, call control processor 224 allocates the system resources within the various entities. Both hardware and software resources are allocated to handle the call. For example, modulator/demodulator pair 212 is allocated in base station 210A. CDMA interconnect system (CIS) 216 connects modulator/demodulator pair 212 to system controller 218. Within system controller 218, selector 220A is allocated to handle the call. From selector 220A, switch 226 is used to connect the call to the PSTN or connect the call back to system controller 218. The address designations of the allocated resources and control information must be passed among the various entities to establish a path from remote unit 200 to the PSTN. All told, more than 30 messages must be sent to establish a traffic channel. Note that the PTT_on indication is passed to the communications manager (not shown).

The exemplary embodiment of FIG. 4 is used to illustrate the allocation of resources. Of course other architectures could be used in conjunction with the present invention. In addition to different architectures, the functions may be distributed between the equipment elements different than shown in FIG. 1 and FIG. 4. For examples, the function of the communications manager may be integrated into the general system controller equipment or into the selectors.

The communication of the messages and the allocation of resources may take from one to three seconds. For a normal point-to-point call, even a three second delay is tolerable and probably unnoticeable to the end user. Typically when a user places a point-to-point call, he must wait while the destination phone rings. An additional three seconds does not greatly affect the amount of time he must wait for an answer. Contrasting the operation of a point-to-point system with the operation of a push-to-talk dispatch system, in a dispatch system when the remote unit user presses the push-to-talk button, he would like to begin talking immediately. A three second delay is not acceptable to him. A typical dispatch system specifies a maximum delay time of 300 or 400 milliseconds. A process of pre-allocating resources is detailed in co-pending U.S. patent application Ser. No. 08/661,690 entitled "METHOD AND APPARATUS FOR ACCELERATED RESPONSE TO A RESOURCE ALLOCATION REQUEST IN DISPATCH SYSTEM" which was filed Jun. 11, 1996 (now abandoned) and is assigned to the assignee of the present invention. In addition to the pre-allocation process, the present invention reduces the number of resource allocation requests by retaining the allocated link for some period of time after the push-to-talk button is released. The present invention is effective whether or not a pre-allocation process in used.

The operation of the system described above may be vastly different than standard push-to-talk operation. A typical push-to-talk system is implemented using a common frequency or set of two frequencies. Once a remote unit user has pressed the push-to-talk button, he is transmitting on the common frequency and has blocked all others from accessing the channel. He also blocks the channel by pressing his push-to-talk button even when another user was speaking first. Also, typically to avoid feedback, while the talker is speaking his receiver is disabled. To avoid feedback, when the remote unit user depresses the push-to-talk button, his receiver is disabled so that he will not hear his own voice. Therefore if one unit's push-to-talk button is stuck down, not only can no other user access the system but the user himself may not be able to hear a warning message even if an overriding message is transmitted.

In a standard push-to-talk system there is no request of resources and a corresponding grant of resources. Also there is no way to deny access after a remote unit has pressed the push-to-talk button. The present invention is much different. Note that in the preferred embodiment a CDMA multiple access technique is used. (In alternative embodiments other multiple access techniques may be used.) In a CDMA system, more than one remote may transmit on the same frequency at the same time. Even if the remote unit continually transmits, other remote units in the area continue to be able to use the same frequency to communicate on the access channel, dedicated traffic channels, and forward link broadcast channel as well as others. Also note that while the remote unit is talking and generating a reverse link traffic channel signal, it continues to receive the forward link traffic channel signal. If the remote unit user's voice is not included in the forward link traffic channel signal, the speaker on the remote unit may remain enabled while the remote unit is designated as the system talker. In this way, a privileged unit could generate a voice message for the remote unit even when his push-to-talk button is depressed.

In a standard CDMA system the process of receiving a grant to allocate resources and the process of allocating resources may take several seconds as well as a substantial amount of processing resources. In order to preserve system resources and to avoid the associated delay, in the preferred embodiment which is detailed below, when a remote unit presses the push-to-talk button, a set of resources is allocated. When the remote unit releases the push-to-talk button, the resources remain dedicated to the remote unit for some period of time. During the time when the user is not depressing the push-to-talk button, the remote unit designated as active and is said to be hanging. A remote unit which is hanging sends and receives a low rate series of idle messages to preserve the link power control. In this way, when the remote unit user subsequently depresses the push-to-talk button, the link is completely established and immediately responsive. This type of operation accommodates the natural dialog use of a dispatch system. When the pause between push-to-talk activations exceeds a threshold, the resources may be released. After the resources have been released, the remote unit must send an origination message on an access channel to reestablish a connection. Although it is true that at any one time only one remote unit may be talking, more than one remote unit may be active.

Figure 2A:
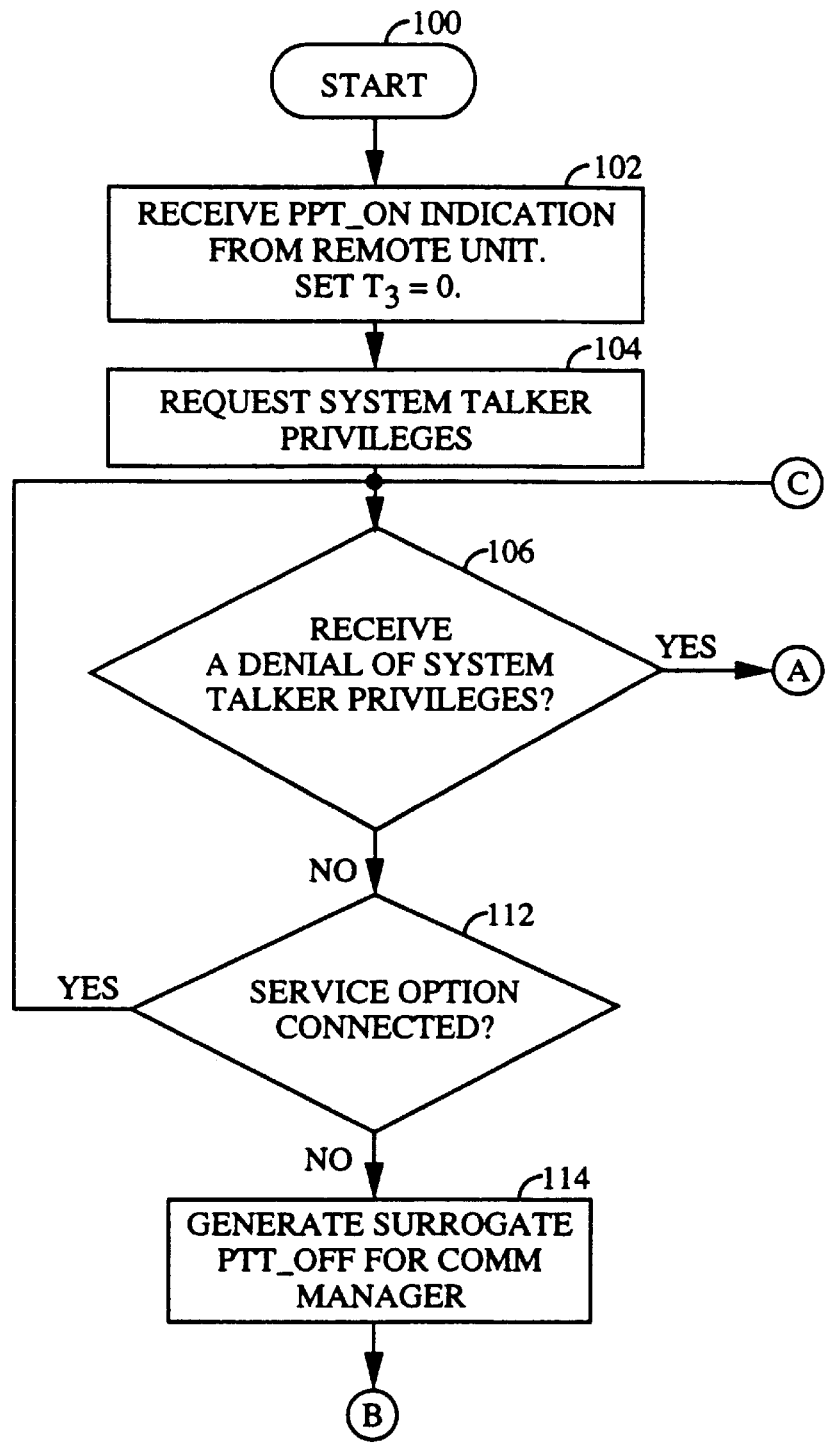
FIGS. 2A and 2B is an exemplary block diagram implementation of a hang time system.
Figure 2B:
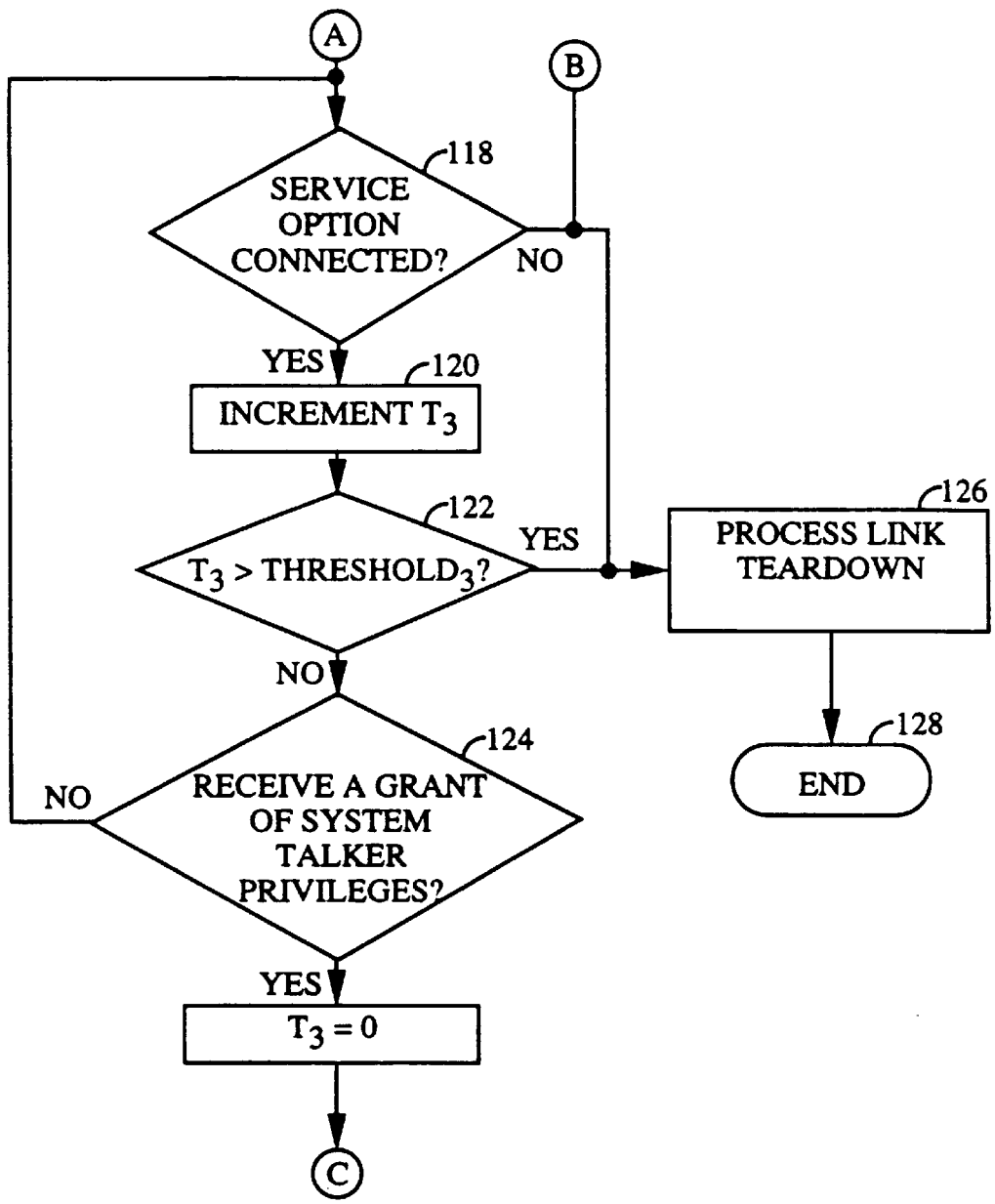

FIGS. 2A and 2B are an exemplary block diagram implementation of a hang time system. "Hang time" is the term used to describe the state in which the remote unit is active and a dedicated link is assigned but during which the remote unit is not the system talker. In the preferred embodiment, the system is executed by base station 28 (of FIG. 1). The system most likely resides in MSC 38 (of FIG. 1) while several of the operations take place within the base station transceiver subsystems. In the most general embodiment, the system may be located in any part of the communications system. The system shown in FIGS. 2A and 2B is executed once for each remote unit which generates a PTT_on indication.

The flow begins in start block 100. If the remote unit is not yet active, the base station processes a request for a grant to allocate resources and the remote unit is assigned resources.

In block 102, a PTT_on indication is received from the remote unit and passed over the link to the communications manager. Also in block 102, the parameter $T_3$ is set to an initial value. Block 106 asks if the communications manager has denied system talker privileges. If another remote unit has already been designated as the system talker, the remote unit may not be granted system talker privileges. If a PTT_off indication has been received from the remote unit, the remote unit is denied system talker privileges. As described extensively with relation to FIGS. 3A and 3B, the communications manager may deny system talker privileges after a grant of system talker privileges if another system talker privileges request is received. Also the communications manager may deny system talker privileges after a grant of system talker privileges if remote unit has had system talker privileges for more than a predetermined amount of time. If the answer is no, flow continues to block 112.

If a remote unit which has been granted system talker privileges moves out of the coverage area of the system or if power is removed from the remote unit or if the remote unit is destroyed, the remote unit is unable to communicate a PTT_off indication to the base station. The base station is aware that the remote unit has exited the coverage area but the communications manager is not. In response to the egress of the remote unit, the base station generates a surrogate PTT_off indication for the remote unit. The communications manager responds by denying the absent remote unit system talker privileges and therefore freeing the system for use by other remote units.

Block 112 asks whether the service option is connected. If the base station is receiving valid frames from the remote unit, the service option is connected. If not, the remote unit may have moved out of the coverage area of the system or may have lost power or may have been destroyed and flow continues to block 114. In block 114, the base station generates the surrogate PTT_off indication and sends it to the communications manager. The base station then processes a request to tear down the link. The execution of the hang time system is complete and flow ends in block 128. Going back to block 112, if the service option is connected, the flow continues back to block 106.

Block 106 asks if the communications manager has denied system talker privileges. If the answer is yes, flow continues in block 118. Blocks 118, 120, 122, 124, and 126 implement the hang time feature. When the remote unit is 'hanging,' it is sending and receiving idle frames to preserve the link. The idle frames fill the system with data so that the system resources remain allocated and the power control on the forward and reverse links continues to function.

Block 118 asks whether the service option is connected in the same manner as block 112. If the option is not connected, the remote unit may have moved out of the coverage area of the system or may have lost power or may have been destroyed. In such a case, the allocated resources can be freed for use by another remote unit and flow continues to block 126. In block 126, the base station processes a link teardown. The execution of the hang time system is complete and flow ends in block 128.

If the service option is connected, flow continues from block 118 to block 120. In block 120, $T_3$ is incremented to reflect the passage of time. In block 122, the current $T_3$ value is compared to a threshold. If the $T_3$ value exceeds the threshold, in block 126 the base station processes a link teardown. The execution of the hang time system is complete and flow ends in block 128. If the $T_3$ value does not exceed the threshold, flow continues to block 124. If during this time the remote unit user presses the push-to-talk button and the remote unit generates a PTT_on indication, the communications manager may grant system talker privileges to the remote unit. Block 124 asks if system talker privileges have been granted to the remote unit. If not, flow continues back to block 118 and the remote unit continues to hang. If a grant of system talker privileges is received, the $T_3$ value is reset, block 108, and the flow continues back in block 106.

Note that if a remote unit wishes to preserve the link and continue to hang longer than the system hang time parameter $T_3$ designates, the remote unit user may 'key' the push-to-talk button by quickly pressing and releasing the push-to-talk button. By such action, the remote unit generates a positive response to the question of block 124. The $T_3$ value is reset in block 108. Because the push-to-talk button is quickly released, a positive answer is generated in response to the inquiry of block 106 and the remote unit begins hanging again for the full $T_3$ duration.

As noted above when the user initially presses the push-to-talk button, a PTT_on indication is sent from the remote unit to the communications manager. When the user releases the push-to-talk button, a PTT_off indication is sent from the remote unit to the communications manager. Nominally, until the PTT_off indication is received, no other user may be granted push-to-talk access. One aspect of the present invention addresses the situation in which a push-to-talk button malfunctions or in which a general non-prioritized interruption is desired.

Figure 3A:
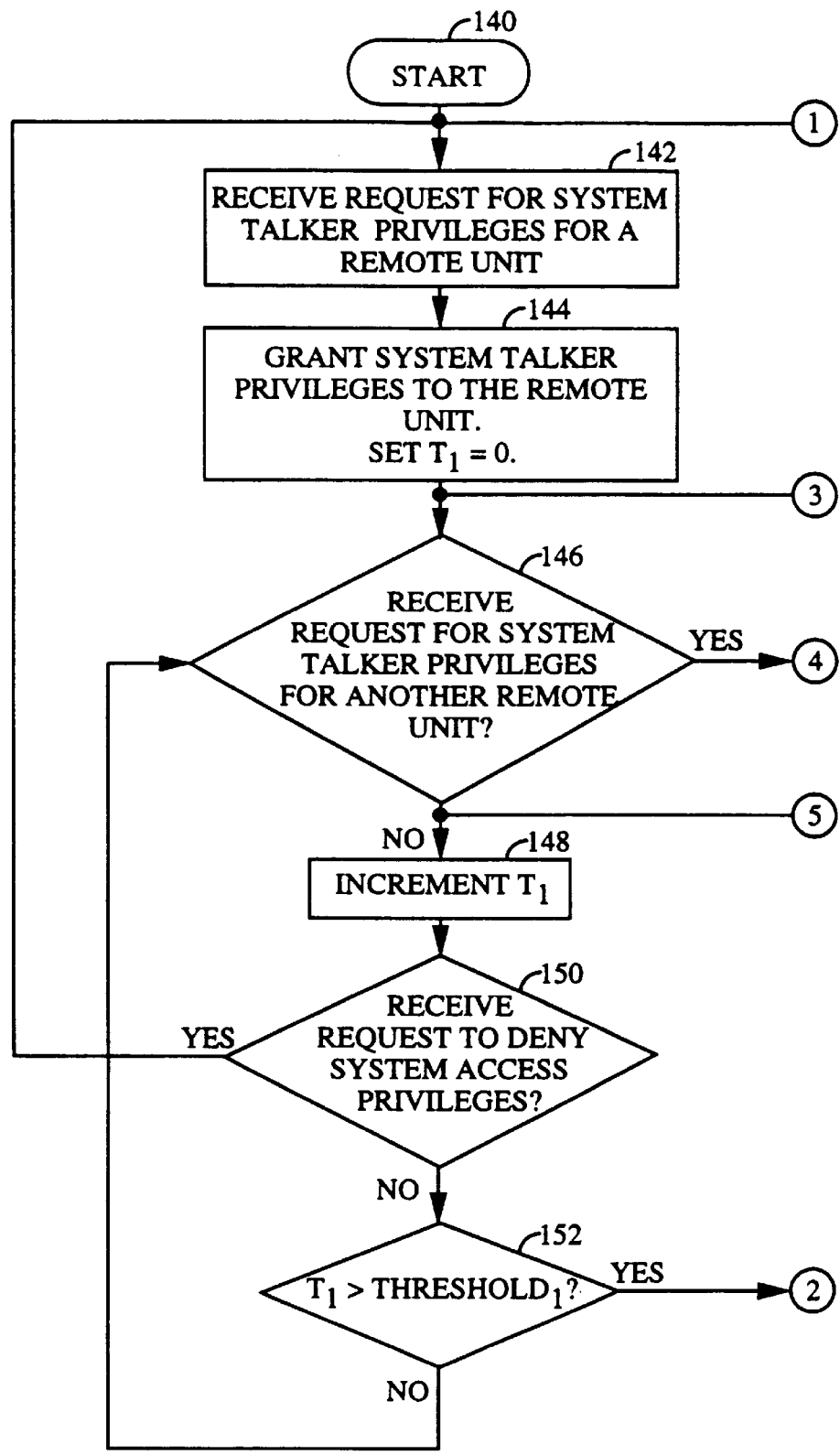
FIGS. 3A and 3B is an exemplary block diagram implementation for access regulation and system protection of a dispatch system.
Figure 3B:
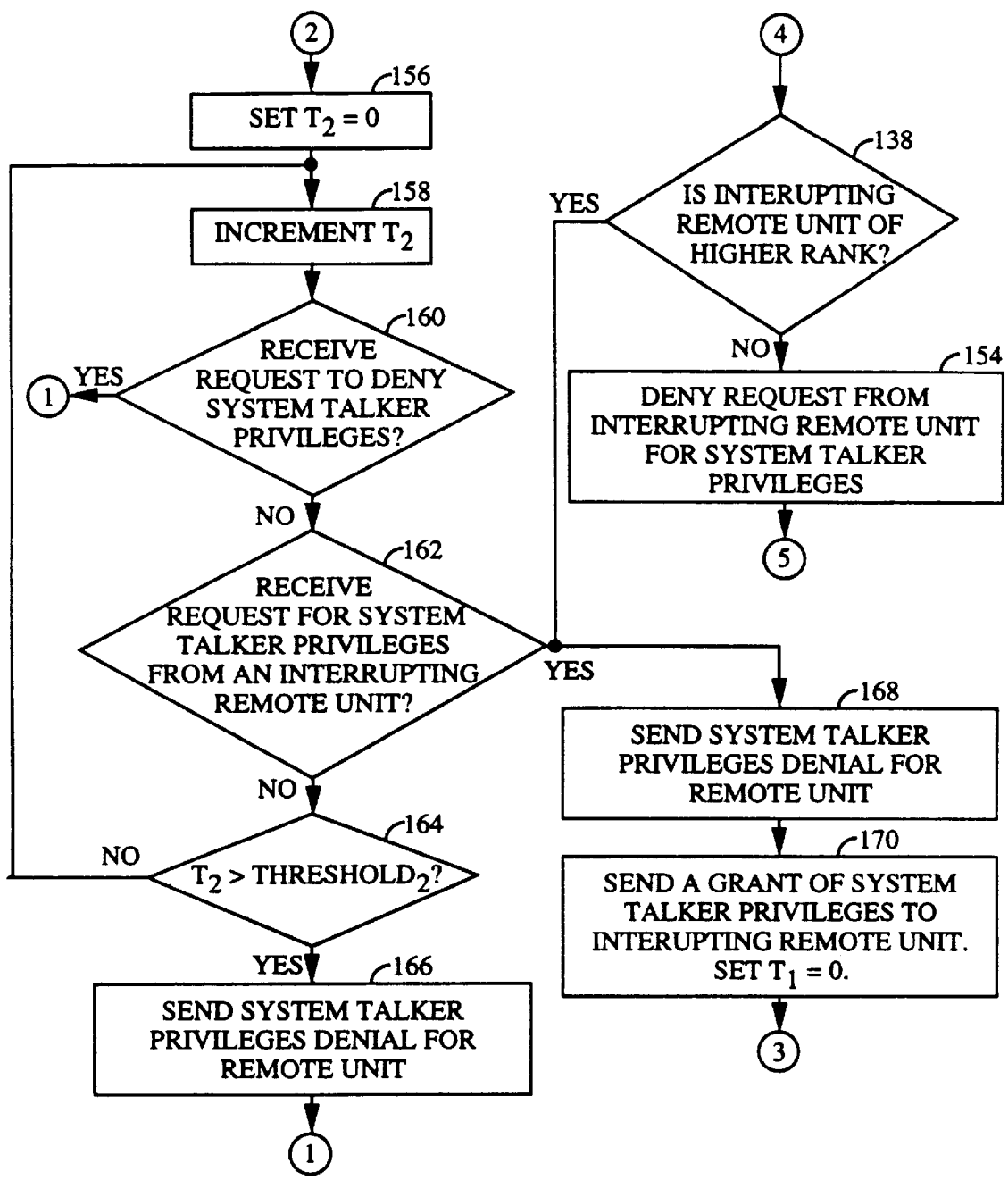

FIGS. 3A and 3B are an exemplary block diagram implementation of a system for access regulation and system protection of a dispatch system. In this case the communications manager divides time into three periods beginning from the time that a remote unit presses the push-to-talk button. During the first period, the remote unit has exclusive control over the link in that no other remote unit of the same rank can interrupt him. When the first period expires a second period begins. During the second period, the remote unit is interruptable by other remote units of the same and possibly lower ranks. If no other remote unit presses the push-to-talk button, the remote unit remains the designated system talker. If another remote unit presses the push-to-talk button, the communications manager sends the original remote unit a denial of system talker privileges and grants the interrupting remote unit system talker privileges. If no interruption is received during the second period, after the end of the second period, the communications manager sends the remote unit a denial of system talker privileges even if no other remote unit is attempting to use the system.

The purpose behind the denial of privileges after the expiration of the second period even if no other user is trying to access the system is system integrity. If the remote unit is validly using the system to communicate, he may re-initiate the connection by simply releasing and depressing the push-to-talk button. On the other hand, if the remote unit has been disabled and is somehow unable to generate the PTT_off indication, the system resources are not wasted. For example, if the remote unit's push-to-talk button is stuck down, it continues to needlessly consume system resources. Also if the system is designed such that the remote unit speaker is disabled when the push-to-talk button is depressed, the release of the link after the end of the second period re-enables the speaker and the remote unit is able to receive messages once again.

In the preferred embodiment, when second period expires or when the remote unit is interrupted by another remote unit, the communications manager generates a denial of system talker privileges. In response the remote unit begins to 'hang' as described above. While hanging, the system resources remain allocated to the remote unit and the remote unit is not subject to resource allocation delays upon pressing the push-to-talk button during the time that it is hanging.

FIGS. 3A and 3B are an exemplary block diagram implementation of a system for access regulation and system protection of a dispatch system and begins with block 140. In block 140 as well as in blocks 142 and 144, no remote unit currently has been granted system talker privileges. In block 142, a request for system talker privileges for a remote unit, typically a PTT_on indication is received by the communications manager. In block 144, the communications manager grants system talker privileges to the remote unit. Also in block 144, $T_1$ is set to an initial value.

Block 146 asks if a request for system talker privileges has been received from another remote unit. If so, block 138 asks if the interrupting remote unit is of higher rank. If not, in block 154, the communications manager issues a denial of the system talker privileges request. As noted above, in response to the denial, the interrupting remote unit may begin to hang and the allocated link remains preserved. Whether or not a system talker privileges request has been received, flow continues to block 148 where $T_1$ is incremented to reflect the passage of time and flow continues to block 150. Block 150 asks if a request to deny system talker privileges, typically in the form of a PTT_off indication, has been received from the remote unit. If so, the flow is directed back to block 142 and the process waits for the next request for system talker privileges. If not, the flow continues to block 152 which asks if $T_1$ exceeds a threshold$_1$. If not, the flow continues back in block 146 and the remote unit remains the system talker and $T_1$ continues to be incremented. If $T_1$ exceeds the threshold$_1$, the first uninterruptable period has ended and the second interruptable period is beginning.

Returning again to block 138 which asks if the interrupting remote unit is of higher rank, in the preferred embodiment, if the interrupting remote unit has a higher rank, it can interrupt the remote unit even during the first period. Therefore if the answer to block 138 is positive, flow continues in block 168. The communications manager sends a denial of system talker privileges to the remote unit in block 168. In block 170, the communications manager also sends a grant of system talker privileges to the interrupting remote unit. $T_1$ is set to an initial value. Flow continues back to block 146.

Block 156 sets the $T_2$ value to an initial value. Block 158 increments $T_2$ to indicate the passage of time. Block 160 asks if a request to deny system talker privileges, generally in the form of a PTT_off indication, has been received from the remote unit. If so, the second period is truncated and operation continues in block 142 when the next request for system talker privileges is received. If a request to deny system talker privileges is not received, flow continues to block 162. Block 162 asks if a request for a grant of system talker privileges has been received from an interrupting remote unit. In the preferred embodiment, any other remote unit may interrupt the remote unit. In an alternative embodiment, only those remote units having equal or higher rank can interrupt the remote unit. If the answer in block 162 is yes, the communications manager sends a denial of system talker privileges to the remote unit in block 168. In block 170, the communications manager also sends a grant of system talker privileges to the interrupting remote unit. $T_1$ is set to an initial value. Flow continues back to block 146.

If no request for system talker privileges has been received from an interrupting remote unit, flow continues from block 162 to block 164. Block 164 asks whether the $T_2$ value exceeds a threshold$_2$. If not, the second period continues back in block 158. If the threshold$_2$ has been exceeded, in block 166 the communications manager sends a denial of system talker privileges to the remote unit. And the system begins again at block 142.

There are many variations and implementations which fall within the scope of the present invention. An implementation may comprise all the elements of the present invention and yet not follow exactly the flow charts of FIGS. 2A and 2B, and FIGS. 3A and 3B. For example, interrupts could be used rather than periodic inquiries into the status of what indications have been received. Obviously the blocks may be reordered within the flow without affecting the operation of the system. Also note that even though the text herein refers to 'remote' units, some of the units may be wireline units.

The previous description of the preferred embodiments is provided to enable any person skilled in the art to make or use the present invention. The various modifications to these embodiments will be readily apparent to those skilled in the art, and the generic principles defined herein may be applied to other embodiments without the use of the inventive faculty. Thus, the present invention is not intended to be limited to the embodiments shown herein but is to be accorded the widest scope consistent with the principles and novel features disclosed herein.

We claim:

1. A method for providing access in a dispatch system, said dispatch system having a plurality of remote units, at least one base station, a communications manager, and a mobile switching center, each of said remote units capable of wireless communication with said at least one base station, comprising the steps of:

establishing a communication resource when requested by a first remote unit;

requesting an exclusive system talker privilege by said first remote unit from said communications manager, said exclusive system talker privilege allowing only one of said plurality of remote units to communicate with other remote units at any given time; and granting said exclusive system talker privilege to said first remote unit.

2. The method of claim 1 wherein the granting step comprises the steps of:

determining that no remote unit already holds said exclusive system talker privilege; and granting said exclusive system privilege to said first remote unit.

3. The method of claim 1 wherein the granting step comprises the steps of:

determining that a second remote unit already holds said exclusive system talker privilege and determining the amount of time that said second remote unit has held said exclusive system talker privilege; and granting said exclusive system talker privilege to said first remote unit and revoking said exclusive system talker privilege from said second remote unit if said second remote unit has held said exclusive system talker privilege for more than a first predetermined amount of time.

4. The method of claim 1 wherein the granting step comprises the steps of:

determining that a second remote unit already holds said exclusive system talker privilege; and granting said first remote unit said exclusive system privilege and revoking said exclusive system talker privilege from said second remote unit if said first remote unit has a higher rank than said second remote unit.

5. The method of claim 1 furter comprising the step of:

revoking said exclusive system talker privilege to any remote unit holding said exclusive system talker privilege for more than a first predetermined amount of time.

6. The method of claim 1 further comprising the step of:

revoking, by said communications manager, said exclusive system talker privilege from said first remote unit holding said exclusive system talker privilege upon receipt of a relinquishment request sent by said first remote unit;

retaining said communication resource for use by said first remote unit for a first predetermined amount of time after receipt of said relinquishment request; and tearing down said communication resource by said communications manager after expiration of said first predetermined amount of time.

7. The method of claim 6 wherein the step of retaining said communication resource comprises the step of sending and receiving a series of idle frames between at least one of said base stations and said first remote unit.

8. The method of claim 7 wherein said series of idle frames comprises power control information.

9. The method of claim 6 wherein said relinquishment request comprises the release of a push-to-talk button on said first remote unit.

10. The method of claim 6 further comprising the step of:

generating a surrogate relinquishment request by at least one of said base stations upon the occurrence of a predefined event; and transmitting said surrogate relinquishment request to said communications manager.

11. The method of claim 10 wherein said predefined event comprises said first remote unit holding said exclusive system talker privilege moving out of a coverage area of said dispatch system.

12. The method of claim 10 wherein said predefined event comprises said first remote unit holding said exclusive system talker privilege losing power.

13. The method of claim 10 wherein said predefined event comprises said first remote unit holding said exclusive system talker privilege being destroyed.

14. An apparatus for providing access in a dispatch system, said dispatch system having a plurality of remote units, at least one base station, a communications manager, and a mobile switching center, each of said remote units capable of wireless communication with said at least one base station, said apparatus comprising:

means for establishing a communication link between a first remote unit and said communications manager when requested to do so by said first remote unit;

means for generating an exclusive system talker privilege request message by a first remote unit, said exclusive system talker privilege allowing only one of said plurality of remote units to transmit at any given time; and means, disposed in said communications manager, for granting or denying said exclusive system talker privilege request to said first remote unit.

15. The apparatus of claim 14 further comprising:

means for retaining said communication link for a predetermined amount of time after said exclusive system talker privilege has been revoked from said first remote unit.

16. The apparatus of claim 14, wherein said means for establishing a communications link comprises said at least one base station, each configured for generating a surrogate message to request that said exclusive system talker privilege be revoked from said first remote unit holding said exclusive system talker privilege upon the occurrence of a predetermined event.

17. The apparatus of claim 16 wherein said predetermined event comprises said first remote unit moving out of a coverage area of said dispatch system.

18. The apparatus of claim 16 wherein said predetermined event comprises a power failure of said first remote unit.

19. The apparatus of claim 16 wherein said predetermined event is the destruction of said first remote unit.

20. The apparatus of claim 14 further comprised of:

means for generating a relinquishment request indicative of the release of a push-to-talk button on said first remote unit.

21. The apparatus of claim 20 wherein said communications manager revokes said exclusive system talker privilege to said first remote unit upon receipt of said relinquishment request message.

22. The apparatus of claim 14 wherein said communications manager comprises:

a timer for measuring the elapsed time during which said first remote unit holds said exclusive system talker privilege;

a detector for determining that a second remote unit has requested said exclusive system talker privilege; and means for determining when said elapsed time has exceeded a first predetermined time and a second pre-determined time.

23. The apparatus of claim 14 wherein said communication retaining means comprises:

idle frame generation means for providing idle frames of information by said base station to a hanging remote unit; and idle frame generation means for providing idle frames of information by a one of said remote units to said communications manager.

24. The method of claim 23 wherein said series of idle frames comprises power control information.

* * * * *